US009301002B2

(12) United States Patent
Hwang

(10) Patent No.: US 9,301,002 B2
(45) Date of Patent: Mar. 29, 2016

(54) METHOD FOR TRANSMITTING PLURALITY OF ASYNCHRONOUS DIGITAL SIGNALS

(71) Applicant: IDENCORE CO., LTD., Seoul (KR)

(72) Inventor: In Jun Hwang, Yongin (KR)

(73) Assignee: PIXELPLUS CO., LTD., Suwon (KR)

( * ) Notice: Subject to any disclaimer, the term of this patent is extended or adjusted under 35 U.S.C. 154(b) by 0 days.

(21) Appl. No.: 14/390,979

(22) PCT Filed: Apr. 5, 2013

(86) PCT No.: PCT/KR2013/002874
§ 371 (c)(1),
(2) Date: Oct. 6, 2014

(87) PCT Pub. No.: WO2013/151383
PCT Pub. Date: Oct. 10, 2013

(65) Prior Publication Data
US 2015/0081070 A1  Mar. 19, 2015

(30) Foreign Application Priority Data

Apr. 6, 2012 (KR) ........................ 10-2012-0035983

(51) Int. Cl.
| G06F 17/00 | (2006.01) |
| H04N 21/43 | (2011.01) |
| H04N 21/236 | (2011.01) |
| G06F 17/30 | (2006.01) |

(52) U.S. Cl.
CPC ........ *H04N 21/4307* (2013.01); *G06F 17/3074* (2013.01); *H04N 21/23602* (2013.01)

(58) Field of Classification Search
CPC .... H04H 60/02; H04H 60/04; H04L 65/4076; H04L 65/605; H04N 21/2389; H04N 21/242; H04N 21/2665; H04N 21/4307; H04N 21/4385; H04N 21/6125; H04N 21/64769
See application file for complete search history.

(56) References Cited

U.S. PATENT DOCUMENTS

| 7,756,595 | B2* | 7/2010 | Asada | H04H 60/04 |
| | | | | 700/94 |
| 9,178,631 | B2* | 11/2015 | Cottrell | H04H 60/02 |
| 2002/0103919 | A1* | 8/2002 | Hannaway | H04N 21/23406 |
| | | | | 709/231 |
| 2006/0224262 | A1* | 10/2006 | Asada | H04H 60/04 |
| | | | | 700/94 |
| 2014/0314237 | A1* | 10/2014 | Cottrell | H04H 60/02 |
| | | | | 381/2 |

FOREIGN PATENT DOCUMENTS

| JP | 10-098457 A | 4/1998 |
| JP | 11-075211 A | 3/1999 |
| KR | 10-2001-0026249 A | 4/2001 |
| KR | 10-2006-0001439 A | 1/2006 |

OTHER PUBLICATIONS

International Search Report for PCT/KR2013/002874 filed Apr. 5, 2013.

* cited by examiner

*Primary Examiner* — Andrew C Flanders

(57) ABSTRACT

The present invention relates to a method for transmitting a plurality of asynchronous signals, which includes: transmitting to a plurality of audio synchronizers a plurality of asynchronous audio signals which is detected by different audio input devices and is not synchronized with each other; synchronizing, by the plurality of audio synchronizers, the plurality of asynchronous audio signals, respectively; and multiplexing, by a multiple-channel time-division multiplexer, the plurality of synchronized audio signals to a multiple-channel time-division audio signal.

10 Claims, 12 Drawing Sheets

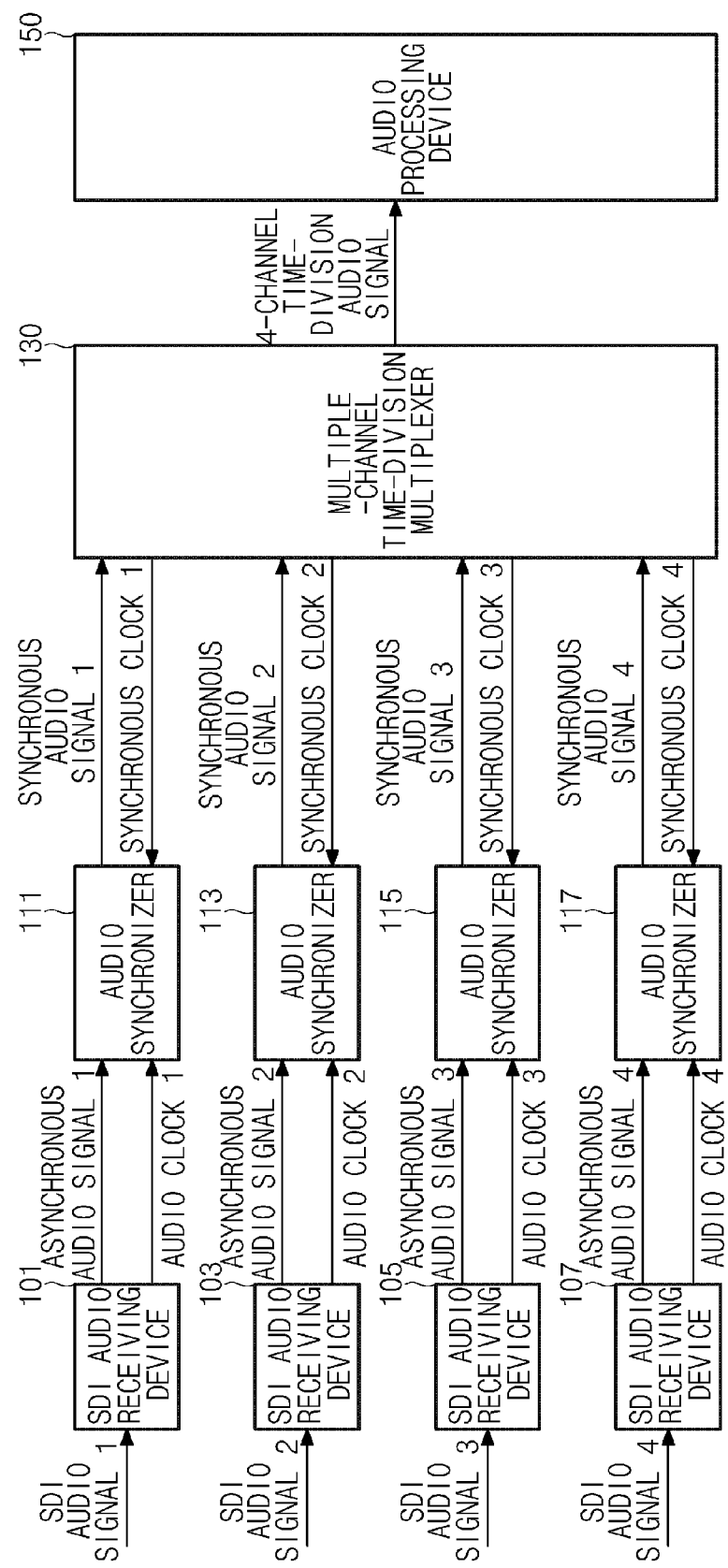

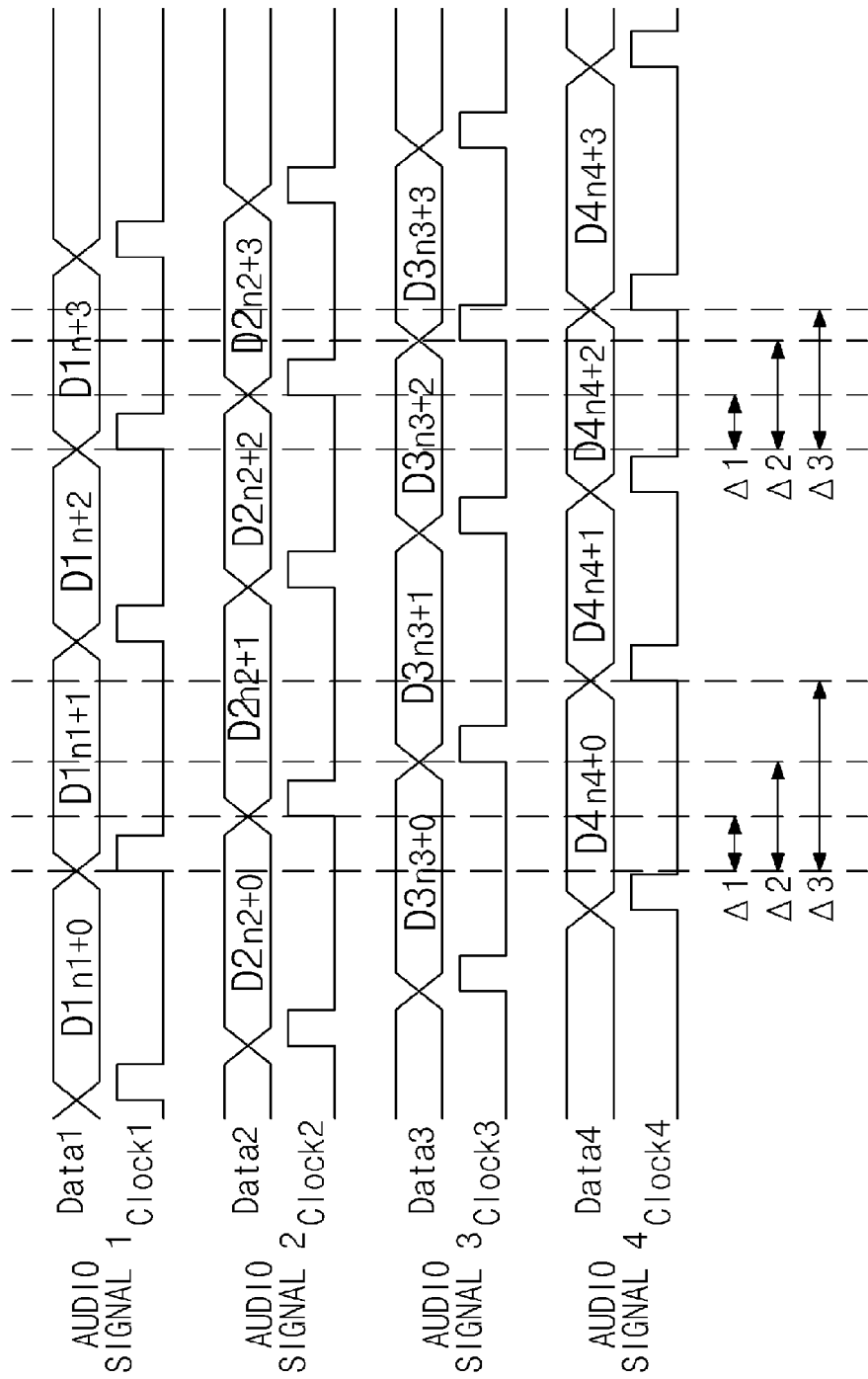

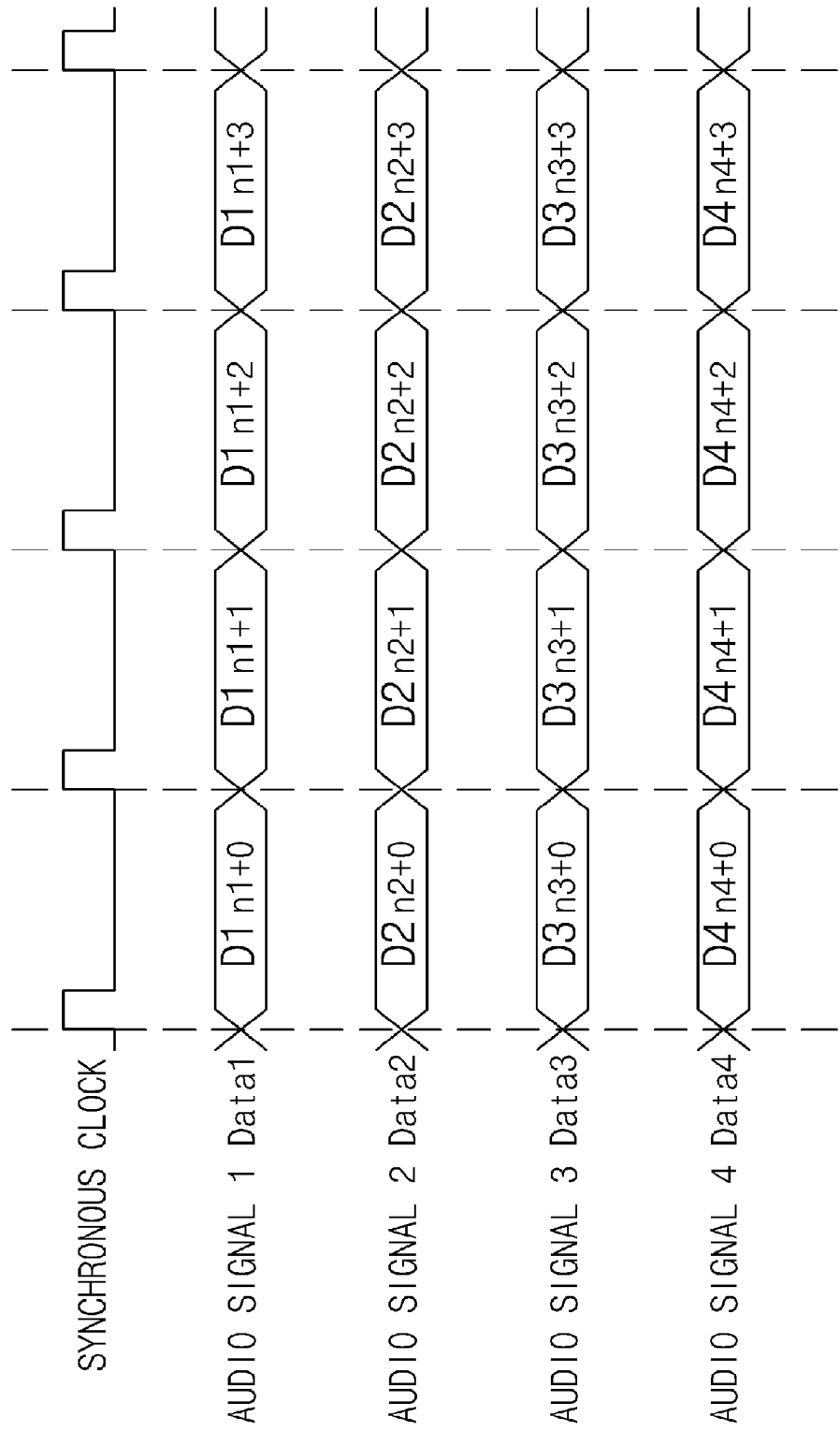

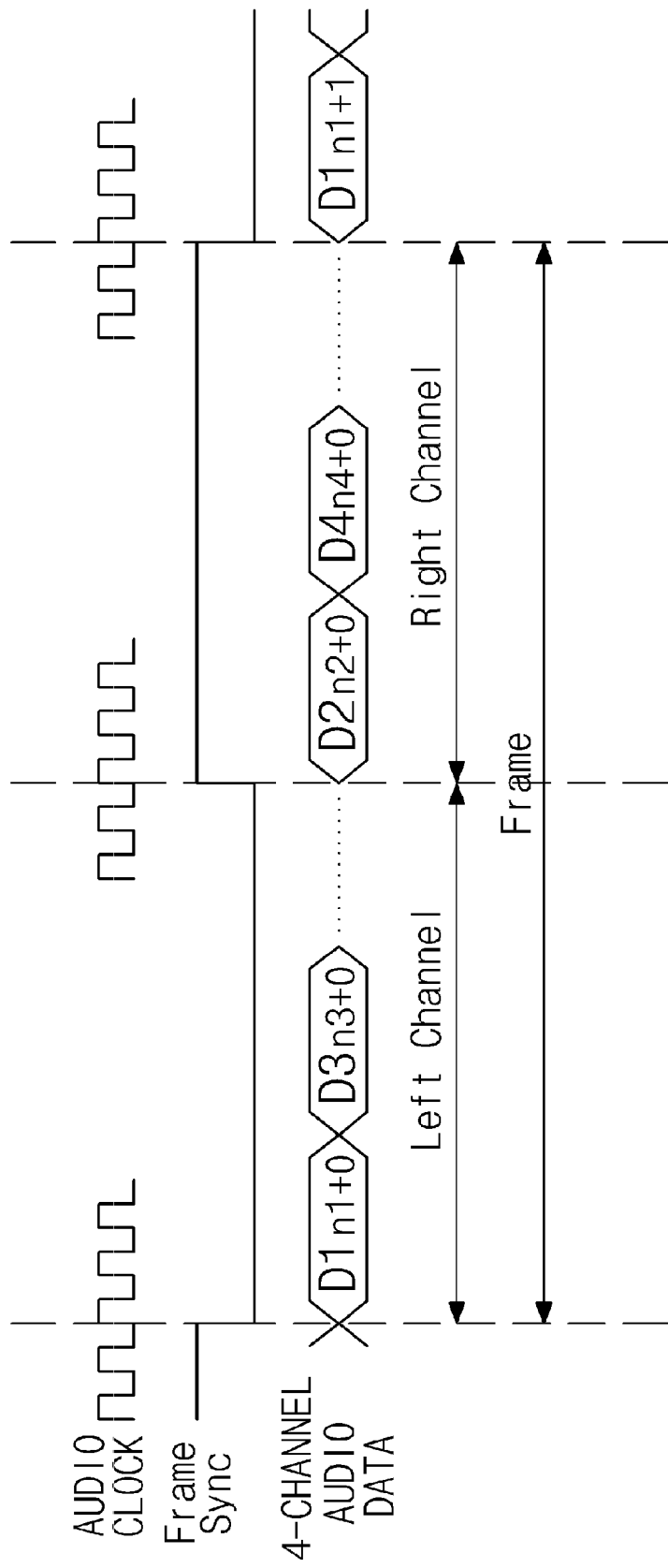

METHOD FOR TRANSMITTING PLURALITY OF ASYNCHRONOUS DIGITAL SIGNALS

TECHNICAL FIELD

The present invention relates to a method for transmitting a plurality of asynchronous digital signals, and more particularly, to a method for synchronizing a plurality of digital signals which are not synchronized in order to transmit the plurality of digital signals to a subsequent processing device.

BACKGROUND ART

A digital video recorder system as a system that can compress and store a digital video/audio signal based on a large-capacity storage device and restore and reproduce the compressed and stored digital video/audio signal is, for example, a system that collects a signal by using a digital transmission camera, and transmits the collected signal to processing devices for subsequent processing through transmission devices to compress, store, restore, or reproduce the transmitted signal.

Audio signals or video signals input through the digital transmission camera are sampled by a clock in the transmission camera to be converted into a serial digital interface (SDI) audio signal or an SDI video signal and transmitted to the transmission devices.

FIG. 1a is a diagram illustrating a method for transmitting an audio signal in the related art and FIG. 1b is a diagram illustrating a method for transmitting a video signal in the related art.

As illustrated in FIG. 1a, SDI audio signals collected or detected through a plurality of digital transmission cameras are transmitted to an audio processing device through respective SDI audio receiving devices and respective audio transmitting devices. Meanwhile, as illustrated in FIG. 1b, SDI video signals collected or detected through the plurality of digital transmission cameras are transmitted to a video processing device through respective SDI video receiving devices.

Since a plurality of audio signals or a plurality of video signals input into the audio processing devices or the video processing devices is signals collected or detected by different digital transmission cameras as described above, sampling clocks are different from each other and although the sampling clocks are set to be the same, when the digital transmission cameras are installed in different areas, noise or a predetermined difference is generated during transmitting the signal. Consequently, the audio signals or the video signals are input into the audio processing device or the video processing device in forms of signals which have different sampling clocks from each other, that is, are not synchronized. Therefore, there is a problem in that a lot of connection terminals are required to input the signals which are synchronized in the audio processing device and the video processing device.

DISCLOSURE

Technical Problem

In order to solve the problems, the present invention provides a method for transmitting a digital signal, which can transmit a plurality of signals to a subsequent processing device by using a small number of connection terminals by synchronizing a plurality of signals which is not synchronized and time-division multiplexing and transmitting the synchronized signals.

Technical Solution

In order to achieve the object, the present invention includes: transmitting to a plurality of audio synchronizers a plurality of asynchronous audio signals which is detected by different audio input devices and is not synchronized with each other; synchronizing, by the plurality of audio synchronizers, the plurality of asynchronous audio signals, respectively; and multiplexing, by a multiple-channel time-division multiplexer, the plurality of synchronized audio signals to a multiple-channel time-division audio signal.

In order to achieve the object, the present invention includes: transmitting to a plurality of video synchronizersa plurality of asynchronous video signals which is detected by different video input devices and is not synchronized with each other; synchronizing, by the plurality of video synchronizers, the plurality of asynchronous video signals, respectively; and multiplexing, by a time-division multiplexer, the plurality of synchronized video signals to a multiple-channel time-division video signal.

Advantageous Effects

According to the present invention, since a plurality of signals which is collected or detected through different input devices and is not synchronized can be synchronized, it is very effective to integrate and manage audio signals or video signals input through signal input devices distributed in respective areas, for example, various security cameras (for example, a CCTV).

In more detail, since the synchronized signals can be time-division multiplexed, the multiplexed signal can be provided to a subsequent processing device. Therefore, the number of connection terminals required to transmit the synchronized signal to the subsequent processing device can be absolutely decreased to be smaller than the number of connection terminals required to transmit asynchronous signals.

Accordingly, cost required for producing and managing the connection terminals can be significantly decreased and the subsequent processing device used in the related art can be continuously used without being replaced or changed.

DESCRIPTION OF DRAWINGS

FIG. 2 is a diagram illustrating a method for transmitting an audio signal according to an exemplary embodiment of the present invention.

FIGS. 4a, 4b, and 4c illustrate a signal of each step in the method for transmitting an audio signal according to the present invention according to an exemplary embodiment of the present invention.

BEST MODE

Figure 1A:
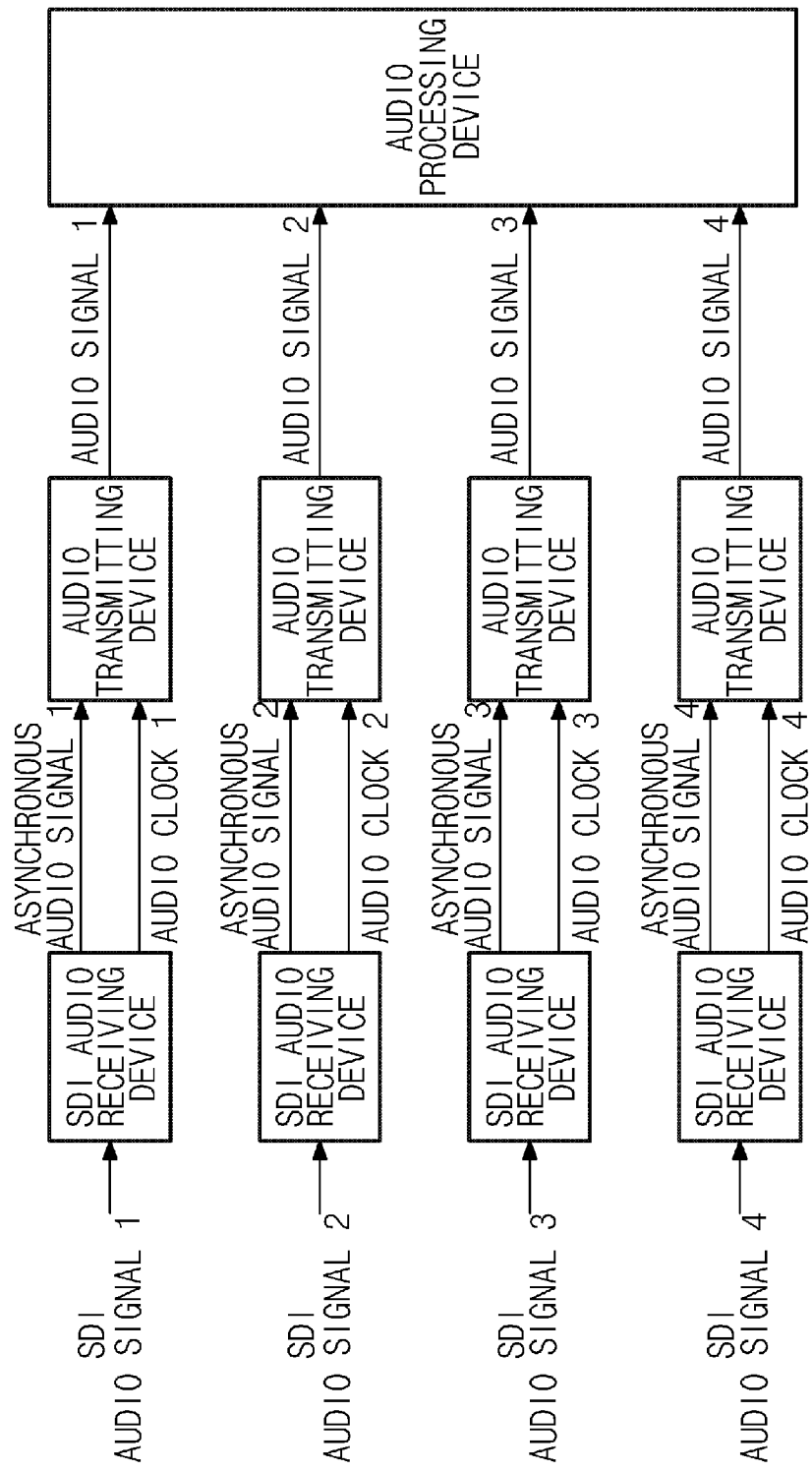
FIG. 1a is a diagram illustrating a method for transmitting an audio signal in the related art and FIG. 1b is a diagram illustrating a method for transmitting a video signal in the related art.
Figure 1B:
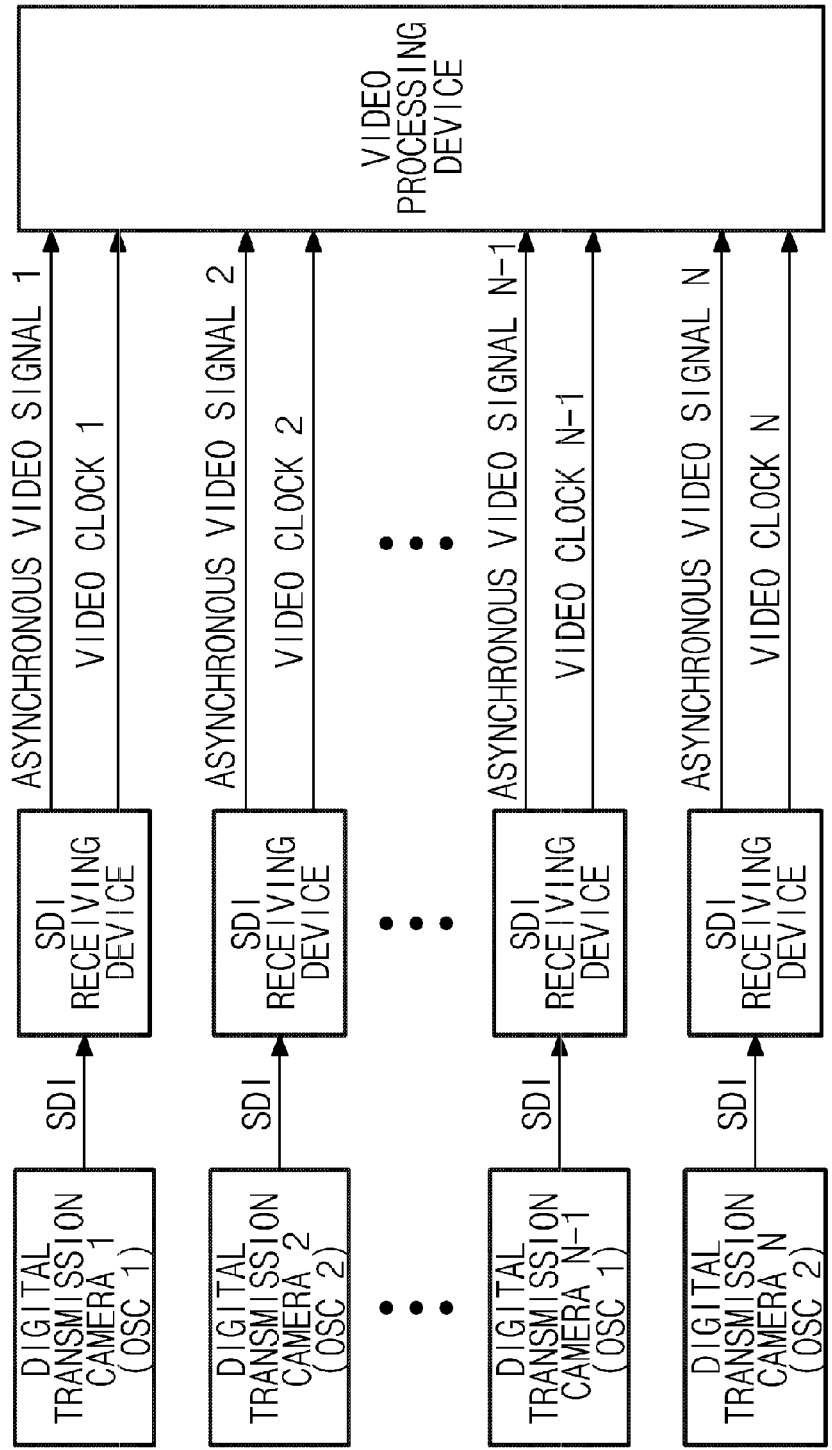

The present invention proposed for the objects and the effects may be described as described in an exemplary embodiment illustrated in drawings given below.

FIG. 2 is a diagram illustrating a method for transmitting an audio signal according to an exemplary embodiment of the present invention.

As illustrated in FIG. 2, each of SDI audio receiving devices 101, 103, 105, and 107 and each of audio synchronizers 111, 113, 115, and 117 are provided for one audio signal, and a plurality of audio signals output from the respective audio synchronizers are multiplexed through a multiple-channel time-division multiplexer 130 and transmitted to an audio processing device 150.

FIG. 2 discloses an exemplary embodiment in which signals are collected or detected through four different audio input devices, but there is no limit in the number of audio input devices. Since the plurality of audio signals collected or detected from the different audio input devices have different sampling clocks during transmission by the audio input devices or to the audio synchronizers 111, 113, 115, and 117, the respective sampling clocks will be, hereinafter, referred to as audio clocks 1 to 4. Therefore, since the plurality of audio signals are not synchronized with each other, the plurality of audio signals will be, hereinafter, referred to as asynchronous audio signals 1 to 4.

An SDI audio signal 1 collected or detected through a first audio input device is input in the SDI audio receiving device 101, and an asynchronous audio signal 1 output from the SDI audio receiving device 101 and an audio clock 1 representing a sampling clock of the asynchronous audio signal 1 are input in the audio synchronizer 111. Therefore, the SDI audio signals 2 to 4 collected or detected through the different audio input devices are input in the audio synchronizers 113, 115, and 117, respectively through the SDI audio receiving devices 103, 105, and 107, respectively.

Herein, the SDI audio signal 1 and the asynchronous audio signal 1 are substantially the same signal and therefore, the signal input in the audio synchronizer 111 may be substantially the same signal as the signal collected or detected through the audio input device and need not particularly be the signal transmitted through the SDI audio receiving device.

Further, the different audio input devices include devices that are installed at different places to detect the audio signals. For example, the different audio input devices may become audio input devices provided in security cameras installed in different areas or audio input devices provided in digital transmission cameras.

As described above, the audio synchronizer 111 receives the asynchronous audio signal 1 and the audio clock 1. The audio synchronizers 113, 115, and 117 also receive the asynchronous signal 2 and the audio clock 2, the asynchronous signal 3 and the audio clock 3, and the asynchronous signal 4 and the audio clock 4, respectively.

The audio synchronizer 111 synchronizes the asynchronous audio signal 1 by using the audio clock 1 and a synchronous clock which is a reference for synchronization to output the synchronous audio signal 1 and the synchronous audio signal 1 is a signal synchronized based on the synchronous clock. Since other audio synchronizers 113, 115, and 117 also use the same synchronous clock, the audio signals output through the audio synchronizers 111, 113, 115, and 117 are the synchronous audio signals 1 to 4, respectively and all of the audio signals are signals synchronized by the same synchronous clock. According to the present invention, the audio synchronizers may be provided as many as the asynchronous audio signals. Herein, the synchronous clock may be provided from the multiple-channel time-division multiplexer 130 or one of the input asynchronous clocks, for example, the audio clocks 1 to 4 may be selected.

Next, the synchronous audio signals 1 to 4 which are the synchronized signals are input in the multiple-channel time-division multiplexer 130 and the multiple-channel time-division multiplexer 130 multiplexes the audio signal 1 to the synchronous audio signal 4 to generate a multiple-channel time-division audio signal. FIG. 2 illustrates a 4-channel time-division audio signal, but there is no limit in the number of channels.

Next, the multiplexed multiple-channel time-division audio signal is transmitted to the audio processing device 150. The audio processing device 150 may perform subsequent processing such as compression, recording, or mixing of the input multiple-channel time-division audio signal.

Figure 3:
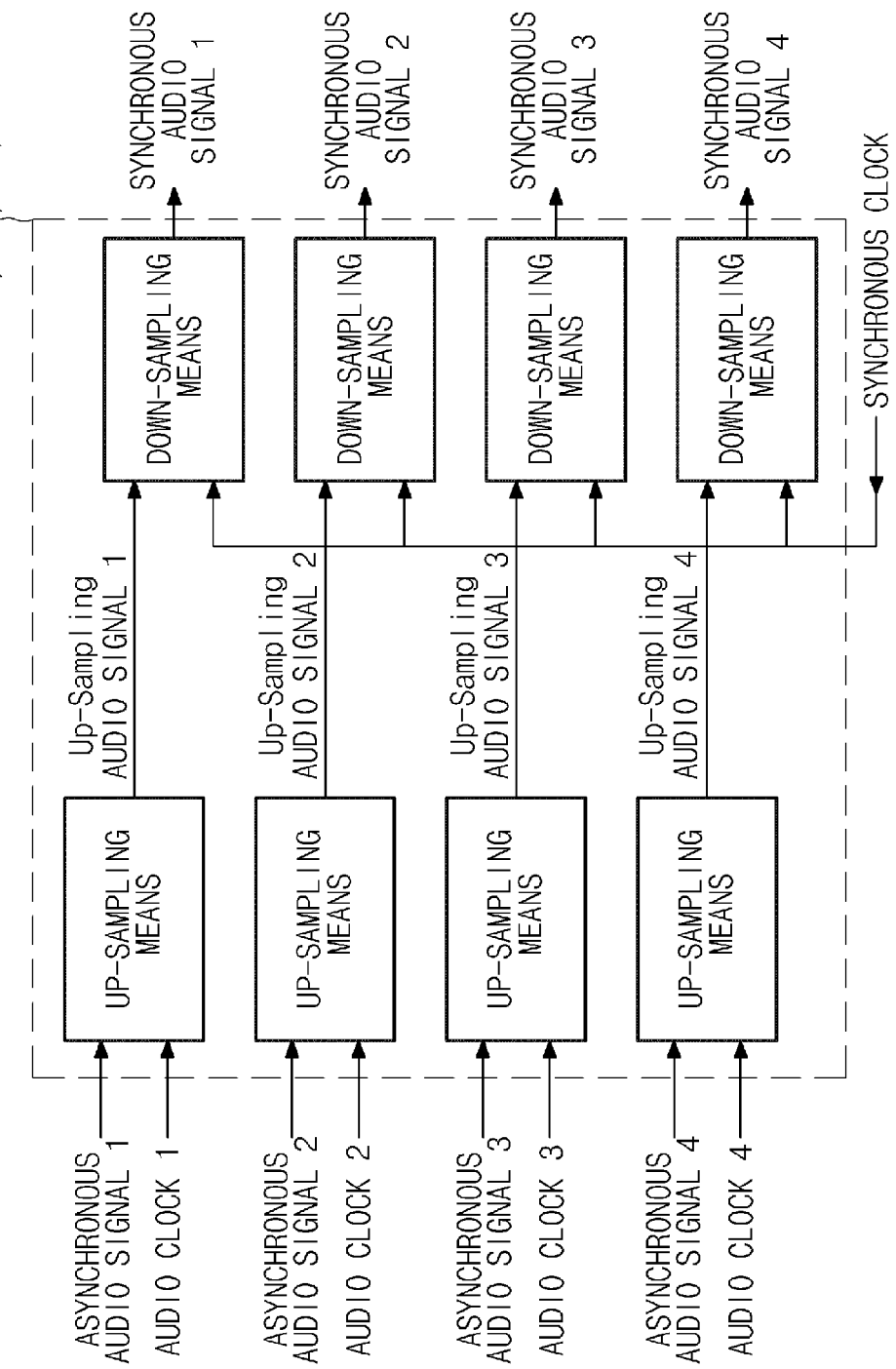
FIG. 3 is a diagram, in more detail, illustrating an audio synchronizer of FIG. 2 according to the exemplary embodiment of the present invention.

FIG. 3 is a diagram, in more detail, illustrating an audio synchronizer of FIG. 2 according to the exemplary embodiment.

As illustrated in FIG. 3, in FIG. 2, each of the audio synchronizers includes an up-sampling means and a down-sampling means.

For example, the up-sampling means included in the audio synchronizer 111 up-samples the asynchronous audio signal 1 and the down-sampling means down-samples the up-sampled audio signal 1 by using the synchronous clock to output the synchronous audio signal 1. Therefore, the synchronous audio signals 1 to 4 are generated through the up-sampling means and the down-sampling means included in the respective audio synchronizers 113, 115, and 117.

FIGS. 4*a*, 4*b*, and 4*c* illustrate a signal of each step in the method for transmitting an audio signal according to the present invention according to an exemplary embodiment.

FIG. 4*a* illustrates the audio signals input in the respective audio synchronizers 111, 113, 115, and 117. Since the respective audio signals are the signals collected or detected through different input devices, the respective audio signals are not synchronized. FIG. 4*b* illustrates signals output from the audio synchronizers 111, 113, 115, and 117. The respective audio signals are synchronized according to the synchronous clock. FIG. 4*c* illustrates a signal output from the multiple-channel time-division multiplexer 130. Four synchronized audio signals are multiplexed to be output as one signal and transmitted to the audio processing device.

According to the audio transmitting method of the present invention, the number of connection terminals for transmitting the signal to the audio processing device may be significantly decreased. For example, when 16 audio signals are intended to be transmitted, since 3 connection terminals are required for one audio signal according to a standard (for example, $I^2S$), a total of 48 connection terminals are required, but according to the present invention, since the synchronized signals may be multiplexed, 16 signals synchronized through a time-division multiplexing process may be decreased to one signal. Therefore, a total of 3 connection terminals are required to decrease the number of connection terminals by 45.

Figure 5:
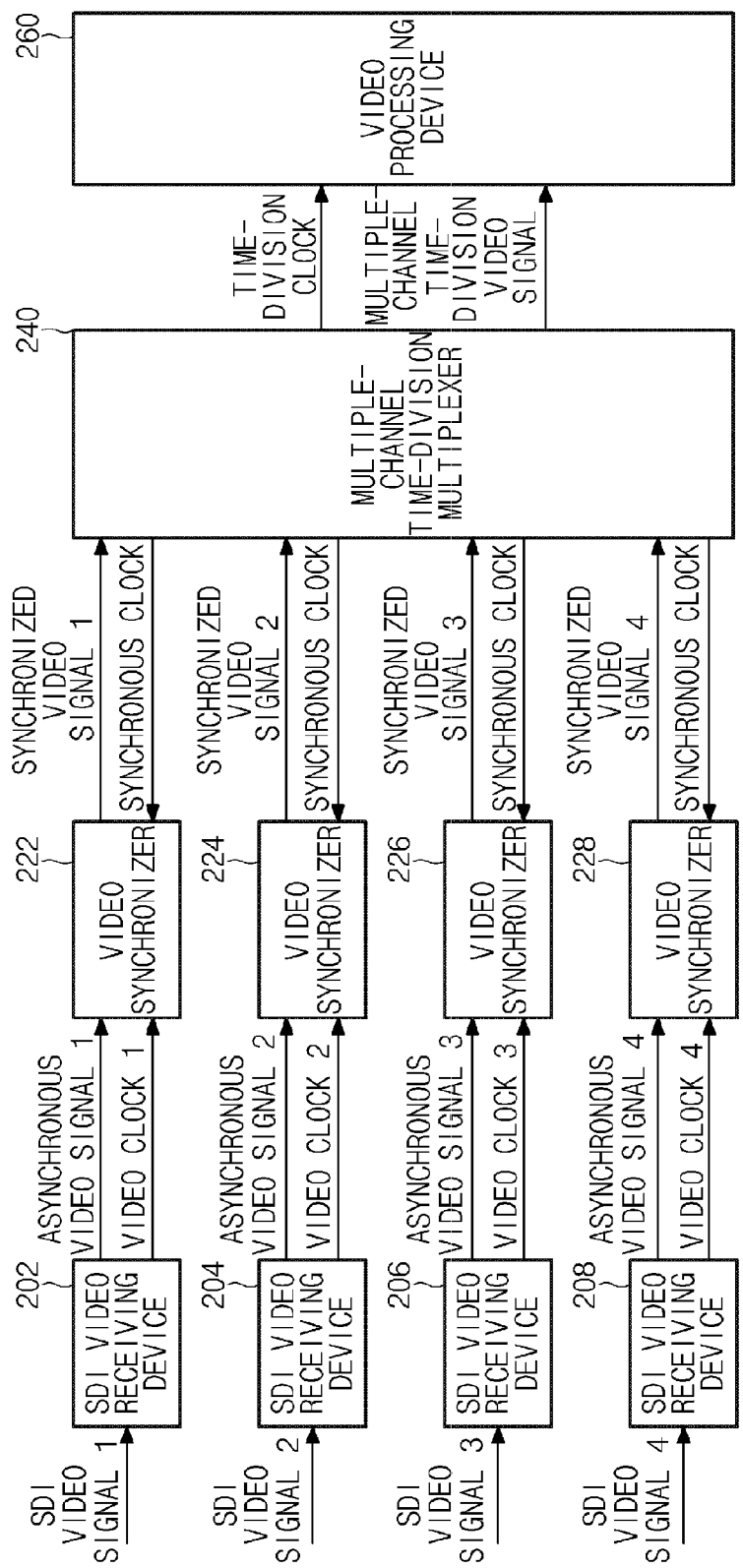
FIG. 5 illustrates a method for transmitting a video signal according to an exemplary embodiment of the present invention.

FIG. 5 is a diagram illustrating a method for transmitting a video signal according to an exemplary embodiment of the present invention.

As illustrated in FIG. 5, each of SDI video receiving devices 202, 204, 206, and 208 and each of video synchronizers 222, 224, 226, and 228 are provided for one video signal, and a plurality of video signals output from the respective video synchronizers are multiplexed through a multiple-channel time-division multiplexer 240 and transmitted to a video processing device 260.

FIG. 5 describes an exemplary embodiment in which the signals are collected or detected through four different video input devices, but there is no limit in the number of video input devices and since the plurality of video signals collected or detected by different video input devices have different sampling clocks while being transmitted by the video input devices or to the video synchronizers 222, 224, 226, and 228, the respective sampling clocks will be, hereinafter, referred to as the video clocks 1 to 4 and since the plurality of video signals are not synchronized with each other, the plurality of video signals will be, hereinafter, referred to as the asynchronous video signals 1 to 4.

An SDI video signal 1 collected or detected through a first video input device is input in the SDI video receiving device 202, and an asynchronous video signal 1 output from the SDI video receiving device 202 and a video clock 1 representing a sampling clock of the asynchronous video signal are input in the video synchronizer 222. Therefore, the SDI video signals 2 to 4 are input in the video synchronizers 224, 226, and 228, respectively through the SDI video receiving devices 204, 206, and 208, respectively.

Herein, the SDI video signal 1 is substantially the same signal as the asynchronous video signal 1 and therefore, the signal input in the video synchronizer 222 may be substantially the same signal as the signal collected or detected through the video input device and need not particularly be the signal transmitted through the SDI video receiving device.

Further, the different video input devices include devices that are installed at different places to detect the video signals and may become, for example, video input devices provided in the security cameras or the digital transmission cameras installed in different areas.

Similarly to the audio signal transmitting method, the video synchronizer 222 synchronizes the asynchronous video signal 1 by using the video clock 1 and a synchronous clock which becomes a reference for synchronization to output the synchronous video signal 1 and the video signals output through the video synchronizers 222, 224, 226, and 228 are the synchronous video signals 1 to 4, respectively and all of the synchronous video signals 1 to 4 are signals synchronized by the same synchronous clock. According to the present invention, the video synchronizers may be provided as many as the asynchronous video signals and the synchronous clock is provided from the multiple-channel time-division multiplexer 240. Next, the synchronous video signals 1 to 4 which are the synchronized signals are input in the multiple-channel time-division multiplexer 240 and the multiple-channel time-division multiplexer 240 multiplexes the synchronous video signal 1 to the synchronous video signal 4 to generate a multiple-channel time-division video signal and there is no limit in the number of channels.

Next, the multiplexed multiple-channel time-division video signal is transmitted to the video processing device 260. The video processing device 260 may perform subsequent processing such as compression, codec, or displaying of the input multiple-channel time-division video signal.

Figure 6:
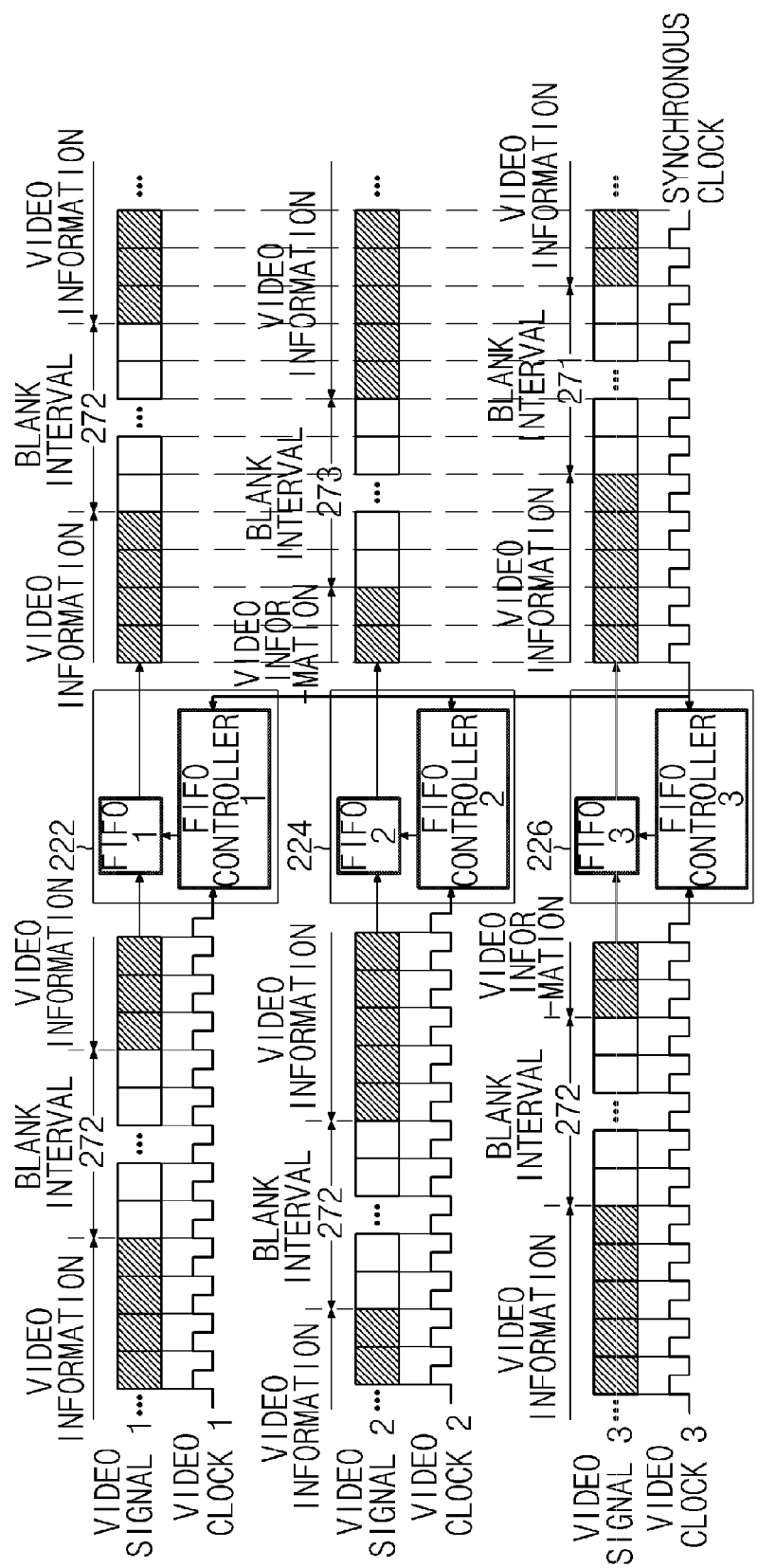
FIG. 6 is a diagram, in more detail, illustrating a video synchronizer according to an exemplary embodiment of the present invention.

FIG. 6 is a diagram, in more detail, illustrating a video synchronizer according to an exemplary embodiment of the present invention.

As illustrated in FIG. 6, each of the video synchronizers may include a first input first out (FIFO) and a FIFO controller. Therefore, the respective asynchronous video signals are synchronized by the FIFOs and the FIFO controllers.

For example, when a frequency of the video clock 1 for the asynchronous video signal 1 is the same as a frequency of the synchronous clock, the asynchronous video signal 1 need not be synchronized any longer. Meanwhile, when a frequency of the video clock 2 for the asynchronous video signal 2 is lower than the frequency of the synchronous clock, the asynchronous video signal 2 may be synchronized based on the synchronous clock through a method for inserting dummy data in a blank interval of the video signal. Further, when a frequency of the video clock 3 for the asynchronous video signal 3 is higher than the frequency of the synchronous clock, the asynchronous video signal 3 may be synchronized through a method for decreasing data in the blank interval of the asynchronous video signal 3. For example, the data in the blank interval is deleted or the data in the blank interval is not read but skipped to synchronize the asynchronous video signal 3.

Figure 7A:
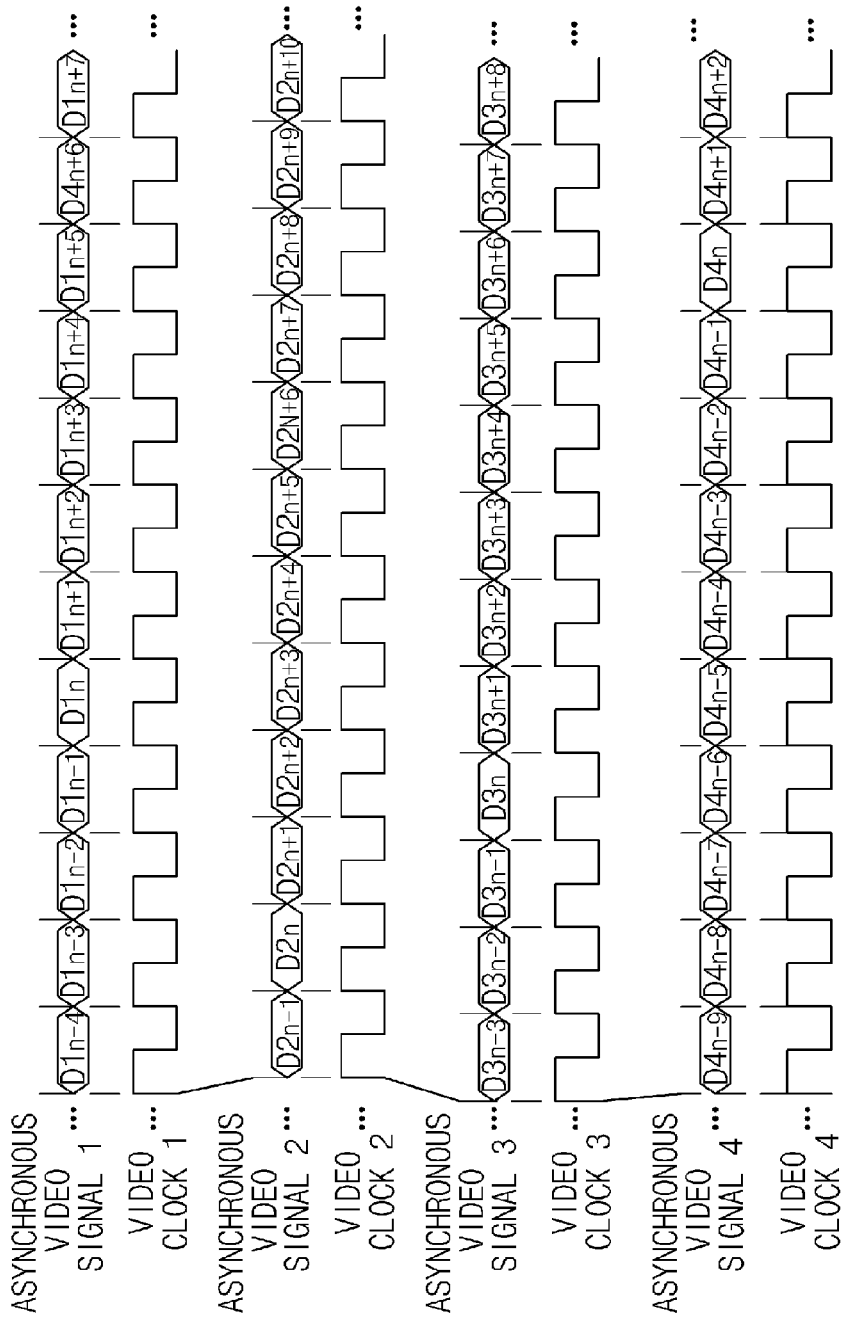
FIGS. 7*a*, 7*b*, and 7*c* illustrate a signal of each step in the method for transmitting a video signal according to an exemplary embodiment of the present invention.
Figure 7B:
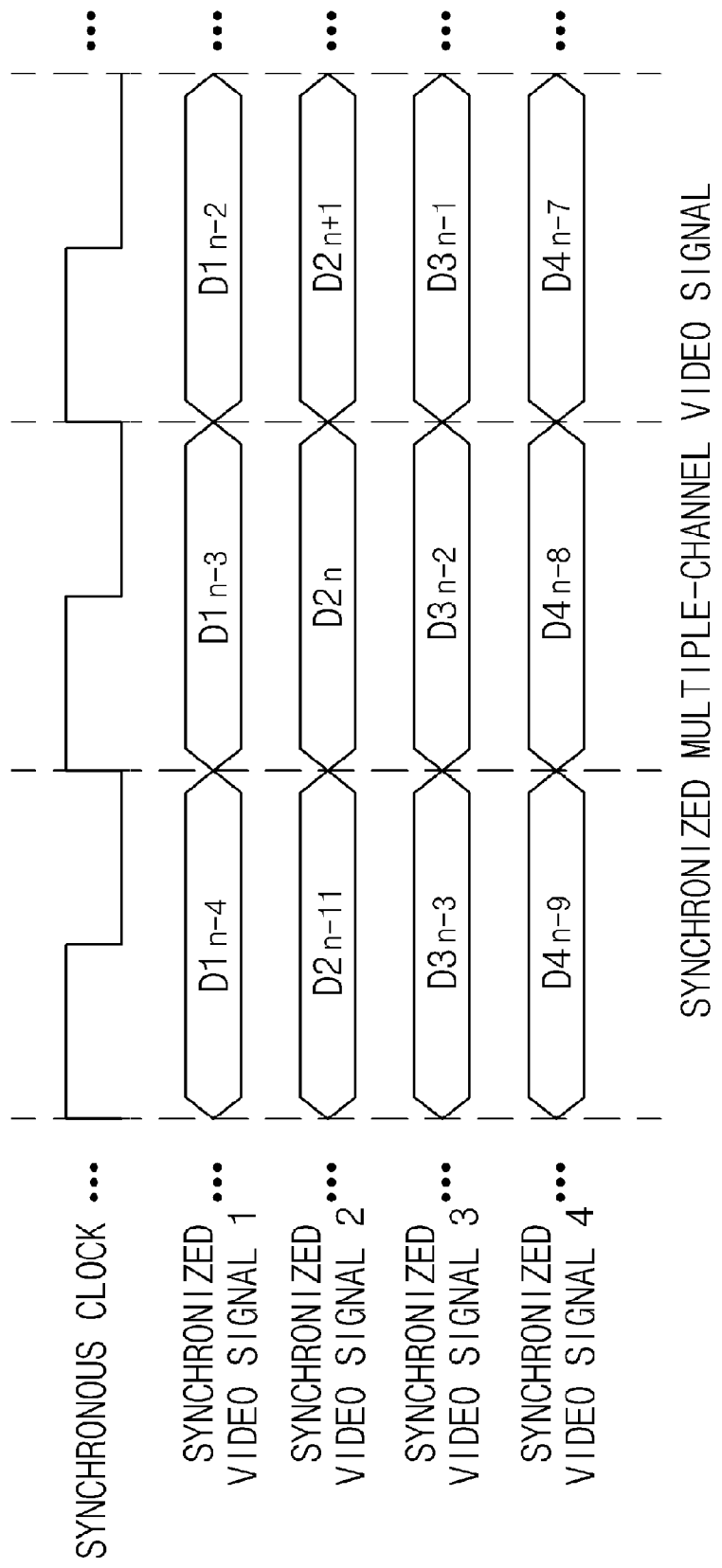
Figure 7C:
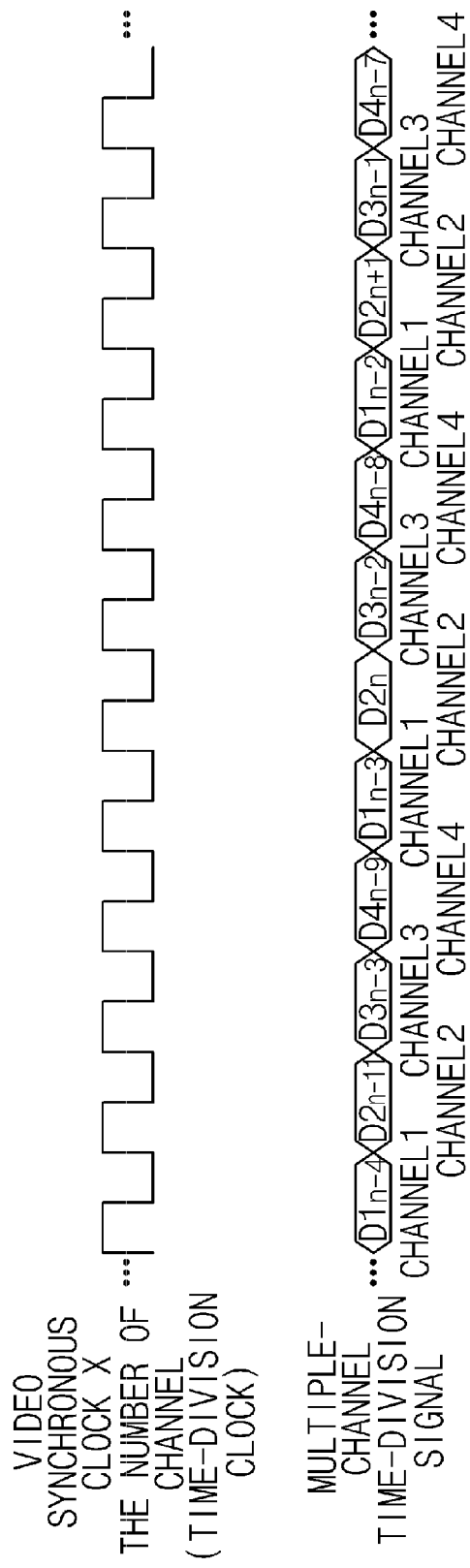

FIGS. 7a, 7b, and 7c illustrate a signal of each step in the method for transmitting a video signal according to an exemplary embodiment of the present invention.

FIG. 7a illustrates the video signals input in the respective video synchronizers 222, 224, 226, and 228. Since the respective video signals are signals collected or detected through different input devices, the respective video signals are not synchronized. FIG. 7b illustrates signals output from the video synchronizers 222, 224, 226, and 228. The respective video signals are synchronized according to the synchronous clock. FIG. 7c illustrates a signal output from the multiple-channel time-division multiplexer 240. Four synchronized video signals are multiplexed to be output as one signal and transmitted to the video processing device.

According to the video transmitting method of the present invention, the number of connection terminals for transmitting the signal to the video processing device may be significantly decreased. For example, when 4 video signals configured by 8 bits are intended to be transmitted, since 8 connection terminals are required for one video signal, a total of 32 connection terminals are required, but according to the present invention, since the synchronized signals may be multiplexed, 4 signals synchronized through the time-division multiplexing process may be decreased to one signal. Accordingly, a total of 8 connection terminals are required, and 24 connection terminals may be removed and therefore, as the number of signals collected or detected from the different video input devices increases, an effect to decrease the number of connection terminals will be increased.

The method for transmitting the plurality of audio signals which is not synchronized and the method for transmitting the plurality of video signals which is not synchronized, which are described above may be implemented in one system.

The present invention may be implemented as codes which may be read by a processor in a processor-readable recording medium. The processor-readable recording medium includes all kinds of recording apparatuses in which processor-readable data are stored. Examples of the processor-recordable recording medium include a ROM, a RAM, a CD-ROM, a magnetic tape, a floppy disk, an optical data storage device, and the like. Further, the processor-readable recording medium is distributed in a computer system connected through a network, and the processor-readable codes may be stored and executed by a distribution method.

While the exemplary embodiments of the present invention have been illustrated and described above, the present invention is not limited to the aforementioned specific exemplary embodiments, various modifications may be made by a person with ordinary skill in the art to which the present invention pertains without departing from the subject matters of the present invention that are claimed in the claims, and these modifications should not be appreciated individually from the technical spirit or prospect of the present invention.

The invention claimed is:

1. A method for transmitting a plurality of asynchronous audio signals, the method comprising:
    transmitting a plurality of asynchronous audio signals which is detected by different audio input devices and is not synchronized with each other to a plurality of audio synchronizers;
    synchronizing the plurality of asynchronous audio signals by the plurality of audio synchronizers, respectively; and
    multiplexing the plurality of synchronized audio signals to a multiple-channel time-division audio signal by a multiple-channel time-division multiplexer,
    wherein in the synchronizing, the plurality of respective asynchronous audio signals are re-sampled and synchronized by using the synchronous clock output from the multiple-channel time-division multiplexer.

2. The method of claim 1, wherein the synchronizing includes:
    up-sampling, by a plurality of up-sampling means, the plurality of asynchronous audio signals, respectively; and
    down-sampling, by a plurality of down-sampling means, the plurality of up-sampled audio signals by using the synchronous clock to output the plurality of synchronized audio signals.

3. The method of claim 1, wherein the different audio input devices are devices that are installed at different places to detect audio signals.

4. The method of claim 1, wherein the multiple-channel time-division audio signal is transmitted to an audio processing device for at least one of compression, recording, and mixing.

5. The method of claim 1, wherein the audio synchronizer performs synchronization by using any one of audio clocks for the plurality of respective asynchronous audio signals as the synchronous clock.

6. A method for transmitting a plurality of asynchronous video signals, the method comprising:
    transmitting a plurality of asynchronous video signals which is detected by different video input devices and is not synchronized with each other to a plurality of audio synchronizers;
    synchronizing the plurality of asynchronous video signals by the plurality of video synchronizers, respectively; and
    multiplexing the plurality of synchronized video signals to a multiple-channel time-division video signal by a time-division multiplexer,
    wherein the synchronizing uses video clocks for the plurality of asynchronous video signals and a synchronous clock output from the time-division multiplexer,
    in the synchronizing,
    when a frequency of the video clock is lower than a frequency of the synchronous clock, dummy data is inserted into a blank interval of the video signal and when the frequency of the video clock is higher than the frequency of the synchronous clock, the plurality of synchronized video signals is output through a method for decreasing data in the blank interval of the video signal.

7. The method of claim 6, wherein the video synchronizer includes a first input first out (FIFO) and a FIFO controller.

8. The method of claim 6, wherein the different video input devices are devices that are installed at different places to detect video signals.

9. The method of claim 6, wherein the multiple-channel time-division video signal is transmitted to a video processing device for at least one of compression, codec, and display.

10. The method of claim 6, wherein the video synchronizer performs synchronization by using any one of video clocks for the plurality of respective asynchronous video signals as the synchronous clock.

* * * * *